United States Patent [19]

Saladino et al.

[11] Patent Number: 4,639,376

[45] Date of Patent: Jan. 27, 1987

[54] ICE CREAM HANDLE

[76] Inventors: Salvatore Saladino, 49 Poynter Dr., Etobicoke, Ontario, M9R 1L3, Canada; Victoria M. Samson, R.R. #4, Brampton, Ontario, L6T 3S1, Canada

[21] Appl. No.: 786,061

[22] Filed: Oct. 10, 1985

[51] Int. Cl.⁴ .............................................. A23G 9/26
[52] U.S. Cl. ...................................... 426/134; 294/1.1; 426/91; 229/DIG. 6; 229/DIG. 7
[58] Field of Search ............. 426/139, 132, 134, 101, 426/90, 95, 100, 138, 420, 421, 91; 229/1.5 H, DIG. 6, DIG.7; D1/116–119, 102–105; 294/1.1

[56]  References Cited

U.S. PATENT DOCUMENTS

| | | | |
|---|---|---|---|
| 1,498,464 | 6/1924 | Marinelli | 426/139 |
| 1,548,970 | 8/1925 | York | 426/134 |
| 1,558,922 | 10/1925 | Reilly | 426/139 |
| 1,623,926 | 4/1927 | Kohler | 426/134 |
| 1,638,480 | 8/1927 | Feybusch | 426/132 |
| 1,794,238 | 2/1931 | McKibben | 426/139 |
| 1,894,545 | 1/1933 | Schoenfeld | 426/139 |
| 1,914,894 | 6/1933 | Moskowitz | 426/139 |
| 1,939,450 | 12/1933 | Horton | 426/91 |
| 1,942,896 | 1/1934 | Jones | 426/139 |
| 1,947,872 | 2/1934 | Nolte | 426/110 |
| 2,030,126 | 2/1936 | Vogt | 426/132 |
| 2,061,260 | 11/1936 | Turnbull | 426/139 |
| 2,087,068 | 7/1937 | Pape | 426/139 |
| 2,121,185 | 6/1938 | Claff | 426/104 |
| 2,190,231 | 2/1940 | Craddock | 426/132 |
| 2,766,123 | 10/1956 | Moubayed | 426/132 |
| 2,924,529 | 2/1960 | Renner | 426/95 |
| 2,929,721 | 3/1960 | Mitzenmacher | 426/134 |
| 2,948,452 | 8/1960 | Grogan et al. | 229/DIG. 7 |
| 3,290,157 | 12/1966 | Schwartz et al. | 426/134 |
| 3,351,258 | 11/1967 | Evantash | 229/DIG. 7 |
| 3,459,296 | 8/1969 | Berg | 426/134 |
| 3,950,548 | 4/1976 | Baker | 426/134 |
| 4,229,482 | 10/1980 | Kreske | 426/134 |
| 4,350,712 | 9/1982 | Kocharian et al. | 426/134 |

FOREIGN PATENT DOCUMENTS 198282  5/1923  United Kingdom ................ 426/134

Primary Examiner—Steven Weinstein
Attorney, Agent, or Firm—Sim & McBurney

[57]  ABSTRACT

A gripping handle on which ice cream and the like can be mounted for storage and consumption includes an elongated, hollow gripping portion with a top end defining a substantially flat annular surface on which a quantity of ice cream can be supported. Projecting up into the ice cream is a hollow head portion which is hollow and communicates with the hollow gripping portion.

5 Claims, 1 Drawing Figure

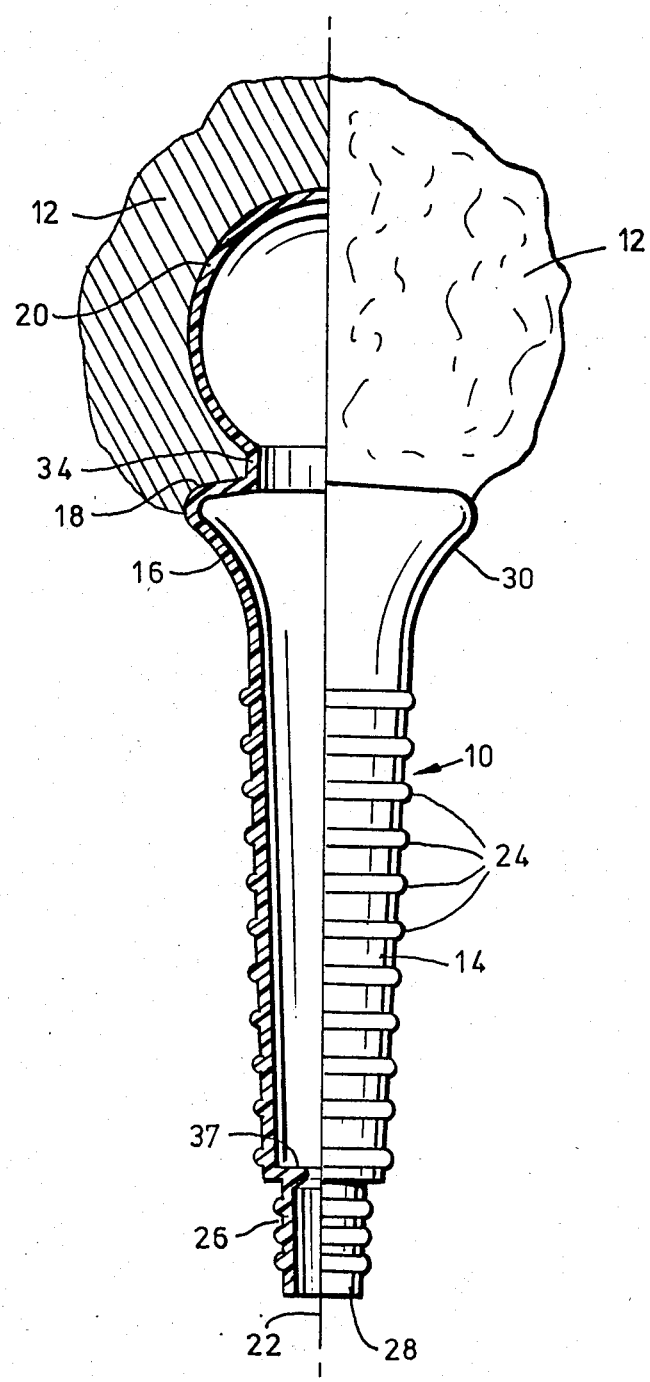

ICE CREAM HANDLE

This invention relates generally to gripping handles for supporting ice cream, frozen yoghurt, and the like.

BACKGROUND OF THIS INVENTION

It is well known that ice cream, frozen yoghurt and similar materials are commonly purchased in an edible conical container with an open top end where the ice cream, etc. is placed.

While this conventional method of serving ice cream is satisfactory in outlets where the ice cream is scooped out of large buckets, and placed in a cone for each order, it has certain disadvantages for a more automated approach to serving ice cream, involving pre-formed and deep-frozen individual servings. Such individual items have incorporated edible cones in the past, but there is always a danger of slow or incomplete freezing leading to sogginess in the cone holder. There is further the necessity to ensure that two different edible materials remain safe to eat during storage.

GENERAL DESCRIPTION OF THIS INVENTION

In view of the foregoing state of the art, it is considered desirable to provide an inert, non-edible ice cream-supporting gripping handle which does not have the problems that edible cones present, and which can be re-used if desired.

One of the problems with conventional edible cones is the rate at which they allow warm ambient air to have access to the ice cream in the cone. Most of these cones are very porous, and heat leakage is common. Also, the typical cone, when it is called upon to support two or three scoops of ice cream, does nothing to stabilize the upper scoops, which are simply pressed down against the lowest scoop. As a result, accidents are common, in which the upper scoops fall off the ice cream cone. In view of this, it would be desirable to provide a gripping handle which is specially designed so as to stabilize and hold an ice cream ball in place, with no danger of falling.

Accordingly, this invention provides a unitary handle on which ice cream and the like can be mounted for storage and consumption. The handle includes an elongated, hollow gripping portion flaring outwardly toward a top end thereof, thence extending inwardly to define a substantially flat annular surface on which a quantity of ice cream can be supported, and a hollow head portion projecting upwardly from the annular surface. The interior of the head portion is in communication with the interior of the gripping portion. The gripping portion has a bottom end remote from the top end, and the bottom end has an opening to the exterior. The opening has a cross-sectional area less than about 60% of the least cross-sectional area within the gripping portion.

GENERAL DESCRIPTION OF THE DRAWING

One embodiment of this invention is shown in the accompanying drawing, in which the single FIGURE shows, to the left of the mid-line, an axial sectional view of a gripping handle, and shows to the right of the midline an elevational view thereof.

DETAILED DESCRIPTION OF THE DRAWING

Attention is now directed to the FIGURE, which shows a gripping handle 10 on which ice cream 12 or the like can be mounted for freezing, storage and consumption. A handle 10 includes an elongated, hollow gripping portion 14 having a top end 16 defining a substantially flat annular surface 18 on which the ice cream 12 can be supported, and a hollow head portion 20 projecting centrally from the top end of the gripping portion 14. In effect, the entire gripping handle 10 is radially symmetrical about a centre axis identified by the line 22.

Both the head portion 20 and the gripping portion 14 are hollow and are in communication with each other. The wall thickness is approximately 0.05", although it will be evident that this thickness is not critical.

The gripping portion 14 is provided with a plurality of longitudinally spaced-apart annular ribs 24, which have the function of decreasing the surface area contact with the consumer's hand, thus reducing the amount of heat transferred from the consumer's hand through the wall of the gripping portion 14 and into its interior.

It is very desirable to minimize such heat transfer, because the interior of the gripping portion 14 and the head 20 acts in the manner of a cold sink, in which the trapped air remains at the temperature of the ice cream 12. When this is deep frozen prior to sale and consumption, the temperature inside the gripping handle 10 can be as low as $-25°$ F.

For moulding purposes, it is convenient to provide an opening from the interior of the gripping portion 14 to the exterior, and in the embodiment shown this opening is at the bottom end 26 remote from the top end 16. As can be seen, the bottom end defines a short tube 28 of smaller diameter than the main part of the gripping portion 14, the tube 28 defining the opening. Preferably, the opening has a cross-sectional area which is less than about 60% of the least cross-sectional area within the gripping portion 14. This is due to the desirability of minimizing convective heat interchange between the exterior air and the air inside the gripping handle 10.

As can be seen, the head 20 is part-spherical, although strict sphericity is not essential. What is important is that there be a portion projecting upwardly from the flat annular surface 18 which can be located at the centre of the ice cream ball, and which can function to support the ball from falling or dislodgement.

Preferably the gripping handle 10 is formed of a plastic or similar material which is impervious to penetration by air, and represents no danger by reason of contacting food. A preferred plastic is polystyrene 210, manufactured by Polysar.

For ease of handling, it will be noted that the gripping portion 14 converges downwardly from the flat annular portion 18 through a bell-like region 30, and that this then merges with a gently tapering conical portion below it, the lower part tapering convergingly away from the flat annular surface 18.

It will be noted that there is provided a short neck portion 34 between the flat annular surface 18 and the head 20. The neck portion 34 is restricted as compared to the two portions which it connects, and the purpose of this is to help retain cold air inside the head 20. The cold air trapped inside the head 20 keeps the ice cream on the surface of the ball cold and hard, and prevents the ice cream from melting. For this reason, the ice cream remains secure and intact throughout consumption, with no dripping.

Further, the neck portion 34, being of smaller diameter than the head 20, prevents removal of the ice cream 12 upwardly off the head 20, as for example when the item is inverted.

The ribbed surface on the gripping portion 14, in addition to minimizing contact with the user's hand, also provides a roughened surface in order to enhance the actual grip on the handle.

The small tubular portion 28 at the bottom can also allow for the use of attachments and accessories of a novelty kind, such as whistles.

Between the portion 28 and the portion 14 is an inward annular rib 37, which even further restricts access between the interior of the portion 14 and the ambient air, and limits convective heat interchange.

The plastic used for the gripping handle 10 is preferably of a heat-insulative type, which minimizes the transfer of heat through to the interior. Being of plastic, the gripping handle will not crack, split or splinter the way wooden sticks normally do.

While one embodiment of this invention has been illustrated in the accompanying drawing and described hereinabove, it will be evident to those skilled in the art that changes and modifications may be made therein without departing from the essence of this invention, as set forth in the appended claims.

The embodiments of the invention in which an exclusive property or privilege is claimed are defined as follows:

1. A unitary handle for supporting an individual serving of pre-formed, deep-frozen ice cream for storage and consumption comprising a hand held elongated hollow gripping portion capable of fitting the contour of the hand flaring outwardly toward a top end thereof, thence extending inwardly to define a substantially flat annular surface sufficient to support an individual serving of ice cream thereon; a closed hollow head portion projecting upwardly from the annular surface sufficient to hold the individual serving of ice cream; said flat annular surface and said head portion being connected by a neck portion which is narrower than both said flat annular surface and said head portion and sufficient to retain cold air inside the head portion sufficient to retain ice cream on the surface of the head portion cold and hard; the interior of the head portion being in fluid communication with the interior of the gripping portion; the gripping portion having a bottom end remote from said top end with the bottom end having an opening to the exterior and with said opening having a cross-sectional area less than about 60% of the least cross-sectional area within the gripping portion sufficient to minimize convective heat interchange between air within the hollow gripping handle and the exterior air.

2. The invention claimed in claim 1, in which the gripping portion has a plurality of longitudinally spaced, annular ribs.

3. The invention claimed in claim 1, in which the handle is integrally formed of plastic.

4. The invention claimed in claim 3, in which the plastic is polystyrene.

5. The invention claimed in claim 1, in which the head portion is part-spherical.

* * * * *